United States Patent
Vu et al.

(10) Patent No.: US 11,966,340 B2
(45) Date of Patent: Apr. 23, 2024

(54) AUTOMATED TIME SERIES FORECASTING PIPELINE GENERATION

(71) Applicant: INTERNATIONAL BUSINESS MACHINES CORPORATION, Armonk, NY (US)

(72) Inventors: Long Vu, Chappaqua, NY (US); Bei Chen, Blanchardstown (IE); Xuan-Hong Dang, Chappaqua, NY (US); Peter Daniel Kirchner, Putnam Valley, NY (US); Syed Yousaf Shah, Yorktown Heights, NY (US); Dhavalkumar C. Patel, White Plains, NY (US); Si Er Han, Xi'an (CN); Ji Hui Yang, Beijing (CN); Jun Wang, Xi'an (CN); Jing James Xu, Xi'an (CN); Dakuo Wang, Cambridge, MA (US); Gregory Bramble, Larchmont, NY (US); Horst Cornelius Samulowitz, Armonk, NY (US); Saket K. Sathe, Mohegan Lake, NY (US); Wesley M. Gifford, Ridgefield, CT (US); Petros Zerfos, New York City, NY (US)

(73) Assignee: International Business Machines Corporation, Armonk, NY (US)

( * ) Notice: Subject to any disclaimer, the term of this patent is extended or adjusted under 35 U.S.C. 154(b) by 123 days.

(21) Appl. No.: 17/654,965

(22) Filed: Mar. 15, 2022

(65) Prior Publication Data

US 2022/0327058 A1 Oct. 13, 2022

Related U.S. Application Data

(60) Provisional application No. 63/200,168, filed on Feb. 18, 2021.

(51) Int. Cl.
*G06F 12/0871* (2016.01)
*G06N 20/00* (2019.01)

(52) U.S. Cl.
CPC ......... *G06F 12/0871* (2013.01); *G06N 20/00* (2019.01); *G06F 2212/604* (2013.01)

(58) Field of Classification Search
None
See application file for complete search history.

(56) References Cited

U.S. PATENT DOCUMENTS 6,928,398 B1  8/2005  Fang
7,124,055 B2  10/2006  Breiman
(Continued)

OTHER PUBLICATIONS

Liu et al., "When Machine Learning Meets Big Data: A Wireless Communication Perspective", IEEE arXiv:1901.08329v1, 2019, (pp. 15).
(Continued)

*Primary Examiner* — Stephanie Wu
(74) *Attorney, Agent, or Firm* — Aaron Pontikos

(57) ABSTRACT

To automate time series forecasting machine learning pipeline generation, a data allocation size of time series data may be determined based on one or more characteristics of a time series data set. The time series data may be allocated for use by candidate machine learning pipelines based on the data allocation size. Features for the time series data may be determined and cached by the candidate machine learning pipelines. Predictions of each of the candidate machine learning pipelines using at least the one or more features may be evaluated. A ranked list of machine learning pipelines may be automatically generated from the candidate machine learning pipelines for time series forecasting based upon evaluating predictions of each of the one or more candidate machine learning pipelines.

17 Claims, 9 Drawing Sheets

(56) References Cited

U.S. PATENT DOCUMENTS

| | | | |
|---|---|---|---|
| 10,375,098 B2 | 8/2019 | Oliner et al. | |
| 10,671,435 B1 | 6/2020 | Gold et al. | |
| 10,713,574 B2 | 7/2020 | Baughman et al. | |
| 11,494,587 B1* | 11/2022 | Ganesan | G06F 18/2148 |
| 2019/0286990 A1* | 9/2019 | Kenney | G06V 10/803 |
| 2020/0151591 A1* | 5/2020 | Li | G06N 3/08 |
| 2020/0334569 A1* | 10/2020 | Moghadam | G06N 3/044 |
| 2021/0241152 A1* | 8/2021 | Fong | G06N 20/00 |

OTHER PUBLICATIONS

Obst et al., "Textual Data for Time Series Forecasting", EDF R&D, France, arXiv:1910.12618v1, Oct. 2019, (pp. 21).

CT Global Solutions & SAS, "EasyAI Visual Data Mining & Machine Learning", www.ctglobalsolutions.com, (pp. 3).

Anonymous, "Next Best Action identification based on simulation of possible actions outcomes evaluated from perspective of scoring and time series prediction", IPCOM000261625D, Mar. 2020, (pp. 6).

Anonymous, "Demand Forecasting Scenario Generation for Regime Switching Processes Production Planning", IPCOM000250609D, Aug. 2017, (pp. 3).

Anonumous, "Smarter Capacity Planner, based on the IFPUG Function Points", IPCOM000202057D, Dec. 2010, (pp. 12).

Liu et al., "An ADMM Based Framework for AutoML Pipeline Configuration", The Thirty-Fourth AAAI Conference on Artificial Intelligence, 2020, 8 pps.

Huang et al., "Efficient Identification of Approximate Best Configuration of Training in Large Datasets", The Thirty-Third AAAI Conference on Artificial Intelligence (AAAI-19), 2019, 8 pps.

Li et al., "Exploiting Reuse in Pipeline-Aware Hyperparameter Tuning", NeurIPS 2018, 13 pps.

Klein et al., "Learning Curve Prediction with Bayesian Neural Networks", ICLR 2017, 16 pps.

Kandasamy et al., "Multi-fidelity Gaussian Process Bandit Optimisation", Journal of Artificial Intelligence Research 66 (2019) 151-196.

Laadan et al., "RankML: Meta Learning-Based Approach for Pre-Ranking Machine Learning Pipelines", <https://arxiv.org/pdf/1911.00108.pdf>, 2019, 8 pps.

Sabharwal et al., "Selecting Near-Optimal Learners via Incremental Data Allocation", AAAI, 2016, 9 pps.

"Amazon Forecast", 7 pps., © 2023, Amazon Web Services, Inc. or its affiliates. All rights reserved., <https://aws.amazon.com/forecast/>.

"Amazon Gluon Time Series", 14 pps., © 2023, Amazon Web Services, Inc. or its affiliates. All rights reserved., <https://aws.amazon.com/blogs/machine-learning/creating-neural-time-series-models-with-gluon-time-series/>.

"DataRobot", 2 pps., Updated Dec. 1, 2022, <https://www.datarobot.com/platform/automated-time-series/>.

"Time Series in Driverless AI", 2 pps., © Copyright 2017-2023 H2O.ai. Last updated on Oct. 30, 2023, <http://docs.h2o.ai/driverless-ai/latest-stable/docs/userguide/time-series.html>.

Microsoft Azure Time Series Insights, Microsoft Azure, 7 pps., © Microsoft 2024, <https://azure.microsoft.com/en-us/services/time-series-insights/>.

"Scikit-learn ensembles for regression", 18 pps., © 2007—2023, scikit-learn developers (BSD License), <https://scikit-learn.org/stable/modules/classes.html#module-sklearn.ensemble>.

* cited by examiner

AUTOMATED TIME SERIES FORECASTING PIPELINE GENERATION

BACKGROUND

The present invention relates in general to computing systems, and more particularly, to various embodiments for automated time series forecasting pipeline generation with data allocation and data caching in a computing system using a computing processor.

SUMMARY

According to an embodiment of the present invention, a method for automated time series forecasting pipeline generation with data allocation and data caching in a computing system is provide. A data allocation size of time series data may be determined based on one or more characteristics of a time series data set. The time series data may be allocated for use by candidate machine learning pipelines based on the data allocation size. Features for the time series data may be determined and cached by the candidate machine learning pipelines. Predictions of each of the candidate machine learning pipelines using at least the one or more features may be evaluated. A ranked list of machine learning pipelines may be automatically generated from the candidate machine learning pipelines for time series forecasting based upon evaluating predictions of each of the one or more candidate machine learning pipelines.

In an additional embodiment, a sequential order of the time series data set may be used while allocating the time series data based on the data allocation size. A holdout data set, a test data set, and a training data set may be identified and determined from the time series data for allocating the time series data. The time series data may be allocated backward in time.

In another embodiment, candidate machine learning pipelines may be to be trained and evaluated using the time series data, the hold data set, a test data set, and a training data set from the time series data.

In another embodiment, the features may be combined with previously determined features for use by the one or more candidate machine learning pipelines and the features may be cached at a final estimator of the one or more candidate machine learning pipelines.

An embodiment includes a computer usable program product. The computer usable program product includes a computer-readable storage device, and program instructions stored on the storage device.

An embodiment includes a computer system. The computer system includes a processor, a computer-readable memory, and a computer-readable storage device, and program instructions stored on the storage device for execution by the processor via the memory.

Thus, in addition to the foregoing exemplary method embodiments, other exemplary system and computer product embodiments for automated evaluation of robustness of machine learning models under adaptive whitebox adversarial operation are provided.

DETAILED DESCRIPTION OF THE DRAWINGS

Figure 1:
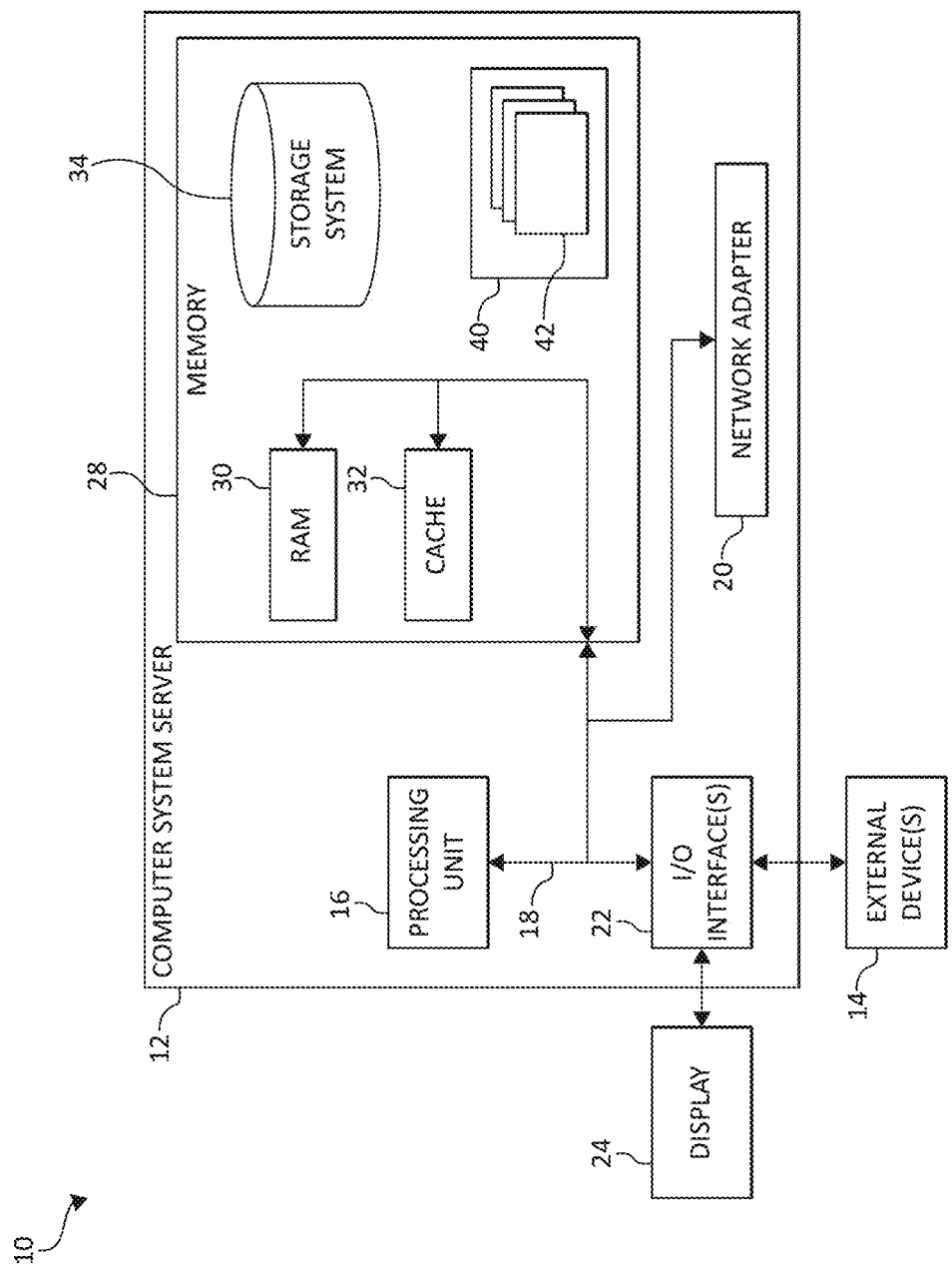
FIG. 1 is a block diagram depicting an exemplary cloud computing node according to an embodiment of the present invention.

The present invention relates generally to the field of artificial intelligence ("AI") such as, for example, machine learning and/or deep learning. Machine learning allows for an automated processing system (a "machine"), such as a computer system or specialized processing circuit, to develop generalizations about particular datasets and use the generalizations to solve associated problems by, for example, classifying new data. Once a machine learns generalizations from (or is trained using) known properties from the input or training data, it can apply the generalizations to future data to predict unknown properties.

Moreover, machine learning is a form of AI that enables a system to learn from data rather than through explicit programming. A major focus of machine learning research is to automatically learn to recognize complex patterns and make intelligent decisions based on data, and more efficiently train machine learning models and pipelines. However, machine learning is not a simple process. As the algorithms ingest training data, it is then possible to produce more precise models based on that data. A machine-learning model is the output generated when a machine-learning algorithm is trained with data. After training, input is provided to the machine learning model which then generates an output. For example, a predictive algorithm may create a predictive model. Then, the predictive model is provided with data and a prediction is then generated (e.g., "output") based on the data that trained the model.

Machine learning enables machine learning models to train on datasets before being deployed. Some machine-learning models are online and continuous. This iterative process of online models leads to an improvement in the types of associations made between data elements. Different conventional techniques exist to create machine learning models and neural network models. The basic prerequisites across existing approaches include having a dataset, as well as basic knowledge of machine learning model synthesis, neural network architecture synthesis and coding skills.

In one aspect, automated AI machine learning systems ("AutoAI systems" or automated machine learning systems "auto ML system") may generate multiple (e.g., hundreds) of machine learning pipelines. Designing a machine learning pipeline involves several decisions such as, for example, which data preparation and preprocessing operations should be applied, which machine algorithm should be used with which settings (hyperparameters). AI machine learning systems may automatically search for an approved or satisfactorily performing pipeline. For this purpose, several machine learning pipelines may be selected and trained to convergence. Its performance is estimated on a hold-out set of the data. However, training a machine learning model on an entire dataset, particularly a time series data set, and waiting until convergence is time consuming.

Time-series data is generated in many systems and often forms the basis for forecasting and predicting future events in these systems. For example, in a data-center, a monitoring system could generate tens to hundreds of thousands of time-series data, each representing the state of a particular component (e.g., CPU and memory utilization of servers, bandwidth utilization of the network links, etc.). Auto-Regressive Integrated Moving-Average ("ARIMA") is a class of statistical models used for modeling time-series data and forecasting future values of the time-series. Such modeling and forecasting can then be used for predicting events in the future and taking proactive actions and/or for detecting abnormal trend. Time series analytics is crucial in various types of industries such as, for example in the financial, internet of things ("IoT"), and/or technical industries. Time series may be noisy and complex and require large datasets, significant amount of time and expertise to train meaningful models, if possible.

Figure 5:
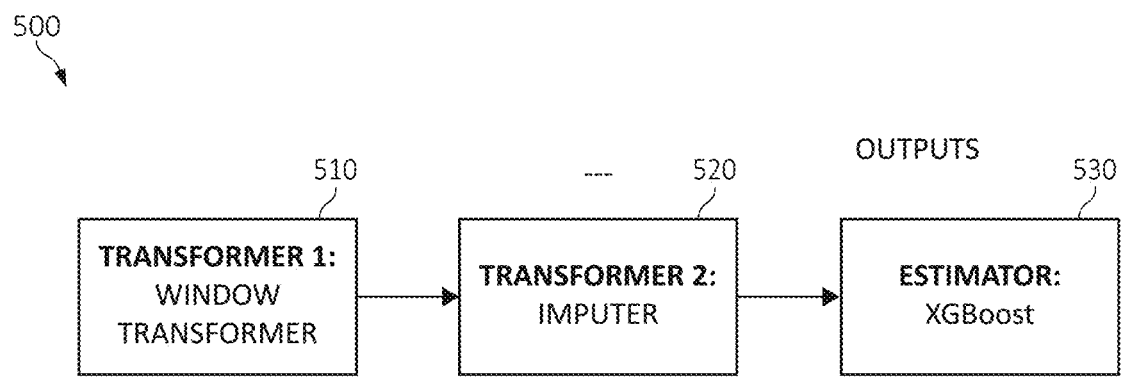
FIG. 5 depicts a machine learning pipeline in a computing environment according to an embodiment of the present invention.

Thus, challenges arise in training and identifying optimize machine learning pipelines particularly as it relates to time series data. In one aspect, a machine learning pipeline may refer to a workflow including a series of transformers and estimators, as illustrated in FIG. 5, depicting an exemplary machine learning pipeline. As such, identifying and selecting optimized machine learning pipelines are crucial components in automated ML systems for time series forecasting. Additionally, quickly identifying ranked machine learning pipelines for time series machine learning pipeline forecasting is a challenge. For example, identifying optimized or "top performing" machine learning pipelines for time series forecasting is difficult due to 1) large data sets from vastly different domains, 2) complexity of multimodal and multivariate time series, and/or 3) a large numbers of estimators and transformers in the machine learning pipeline. Also, evaluation-based operations executing machine learning pipelines with data allocation create additional challenges with time series forecasting due to inefficient data allocation scheme such as, for example, a machine learning pipeline's performance being projected by a simple linear regression and data is allocated in fixed stages without taking into account input time series characteristics. Moreover, evaluation-based operations executing machine learning pipelines are designed for tabular data and not directly applicable to time series (TS) data, due to 1) time series data is sequential; its order cannot be randomized, 2) time series data has seasonality and trend, which should be considered in the data allocation schema, and 3) data evolves over time, so the historical data become less and less relevant as time passes. In this way, the assumption that more training data leads to higher accuracy is inaccurate.

Accordingly, a need exist for providing an automatic evaluation and diagnosis of machine learning pipelines for time series machine learning pipeline forecasting. More particularly, a need exits for providing automated time series forecasting pipeline generation with data allocation and data caching. As such, various embodiments of the present invention provide for and automated machine learning system that select machine learning pipelines using an evaluation-based joint optimizer, which runs machine learning pipelines with incremental data allocation.

Thus, as described herein, mechanisms of the illustrated embodiments provide for a automated machine learning system using an "evaluation-based joint optimizer" ("joint optimizer") that executes machine learning pipelines by performing time series data allocation and caches pre-computed features to improve runtime. The joint optimizer may 1) determine an allocation size based on time series characteristics of time series data (e.g., input data), 2) perform data allocation backward in time, and/or 3) caches pre-computed features and updates final estimator.

Mechanisms of the illustrated embodiments provide advantages over the current state of the art by providing time series data allocation using upper bounds ("TDAUB") for the joint optimization of time series pipelines based on incremental data allocation and learning curve projection. The TDAUB may be based on a data allocation strategy, referred herein as a data allocation using upper bounds ("DAUB") model, following the principle of optimism under uncertainty. That is, under mild assumptions of diminishing returns of allocating more training data, the DAUB model achieves sub-linear regret in terms of misallocated data, which extends to sub-linear regret in terms of the training cost when the training cost functions are not too dissimilar. Further, the DAUB model obtains, without further assumptions on accuracy functions, a bound on misallocated data that is asymptotically tight. In this way, a system utilizing the DAUB model can provide data scientists with live and dynamic monitoring and analysis of a wide range of analytic tools (e.g., the automated tool) and an ability to interact with this system, even when the given data sets are large and training the classifiers could take weeks on the full data set.

In using the TDAUB operation for joint optimization, embodiments of the present invention may provide joint optimization of time series pipelines based on incremental data allocation and learning curve projections. A data allocation size of time series data may be determined based on one or more characteristics of a time series data set. It should be noted that data allocation is critical since the input data may be large in size and the input set of candidate machine learning pipelines may be large. If each candidate machine learning pipeline is provided the entire input dataset, the automated AI machine learning system run time may be too time consuming, especially if hyperparameter optimization ("HPO") is utilized to fine tune candidate pipelines. The data allocation of time series data thus allocates a smaller portion of original time series dataset to candidate machine learning pipelines. A subset of machine learning pipelines is selected from the candidate machine learning pipelines based on performance on a reduced dataset. The time series data may be allocated for use by candidate machine learning pipelines based on the data allocation size.

Features for the time series data may be determined and cached by the candidate machine learning pipelines. Predictions of each of the candidate machine learning pipelines using at least the one or more features may be evaluated. A ranked list of machine learning pipelines may be automatically generated from the candidate machine learning pipelines for time series forecasting based upon evaluating predictions of each of the one or more candidate machine learning pipelines. The learning curves (which may include one or more partial learning curves) may predicts a machine learning pipeline performance level.

In an additional embodiment, a sequential order of the time series data set may be used while allocating the time series data based on the data allocation size. A holdout data set, a test data set, and a training data set may be identified and determined from the time series data for allocating the time series data. The time series data may be allocated backward in time.

In another embodiment, candidate machine learning pipelines may be to train and evaluated using the time series data, the hold data set, a test data set, and a training data set from the time series data.

In another embodiment, the features may be combined with previously determined features for use by the one or more candidate machine learning pipelines and the features may be cached at a final estimator of the one or more candidate machine learning pipelines.

It should be noted, as used herein, there may be two types of learning curves. In one aspect, (e.g., definition 1), a learning curve may be a function that maps a number of training iterations spent to a validation loss. In an alternative aspect, (e.g., definition 2), a learning curve may be a function that maps the fraction of data used from the entire training data to the validation loss. The learning curves may become longer the more training time is spent for the machine learning model. Thus, the mechanisms of the illustrated embodiments, such as, for example, an automated machine learning system, is enabled to process and handle each learning curve that have an arbitrary length and both definition types (e.g., the various learning curve may can even be combined).

In one aspect, a validation loss may be a metric that defines how well (e.g., a measurable value, ranking, range of values, and/or a percentage indicating a performance level) a machine learning model performs. The validation loss may be the loss computed on data that has not been used to train the machine learning model and gives an idea how well the model will perform when being used in practice on new data.

In an additional aspect, as used herein, a machine learning pipeline may be one or more processes, operations, or steps to train a machine learning process or model (e.g., creating computing application code, performing various data operations, creating one or more machine learning models, adjusting and/or tuning a machine learning model or operation, and/or various defined continuous operations involving machine learning operations). In addition, a machine learning pipeline may be one or more machine learning workflows that may enable a sequence of data to be transformed and correlated together in a machine learning model that may be tested and evaluated to achieve an outcome. Additionally, a trained machine learning pipeline may include an arbitrary combination of different data curation and preprocessing steps. The machine learning pipeline may include at least one machine learning model. Also, a trained machine learning pipeline may include at least one trained machine learning model.

In one aspect, a "machine learning model" may be a system that takes as input the curated and preprocessed data and will output a prediction (e.g., the output of all steps that happened before in the machine learning pipeline), depending on the task, and the prediction may be a forecast, a class, and/or a more complex output such as, for example, sentences in case of translation. In another aspect, a machine-learning model is the output generated upon training a machine-learning algorithm with data. After training, the machine learning model may be provided with an input and the machine learning model will provide an output.

In general, as used herein, "optimize" may refer to and/or defined as "maximize," "minimize," or attain one or more specific targets, objectives, goals, or intentions. Optimize may also refer to maximizing a benefit to a user (e.g., maximize a trained machine learning pipeline/model benefit). Optimize may also refer to making the most effective or functional use of a situation, opportunity, or resource.

Additionally, "optimize" need not refer to a best solution or result but may refer to a solution or result that "is good enough" for a particular application, for example. In some implementations, an objective is to suggest a "best" combination of preprocessing operations ("preprocessors") and/or machine learning models/machine learning pipelines, but there may be a variety of factors that may result in alternate suggestion of a combination of preprocessing operations ("preprocessors") and/or machine learning models yielding better results. Herein, the term "optimize" may refer to such results based on minima (or maxima, depending on what parameters are considered in the optimization problem). In an additional aspect, the terms "optimize" and/or "optimizing" may refer to an operation performed in order to achieve an improved result such as reduced execution costs or increased resource utilization, whether or not the optimum result is actually achieved. Similarly, the term "optimize" may refer to a component for performing such an improvement operation, and the term "optimized" may be used to describe the result of such an improvement operation.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random-access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD- ROM, DVD-ROM or other optical media can be provided. In such instances, each can be connected to bus 18 by one or more data media interfaces. As will be further depicted and described below, system memory 28 may include at least one program product having a set (e.g., at least one) of program modules that are configured to carry out the functions of embodiments of the invention.

Program/utility 40, having a set (at least one) of program modules 42, may be stored in system memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
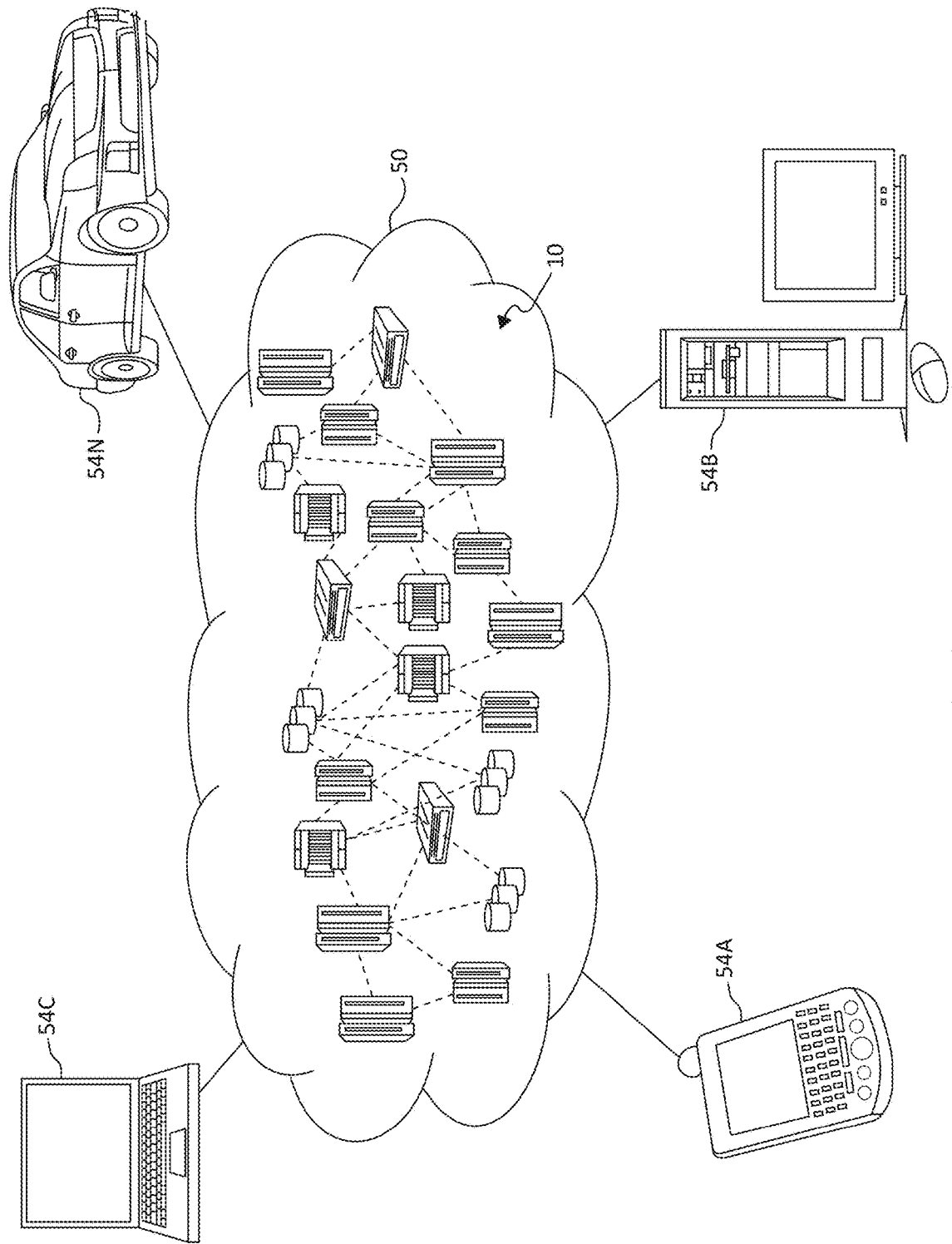
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
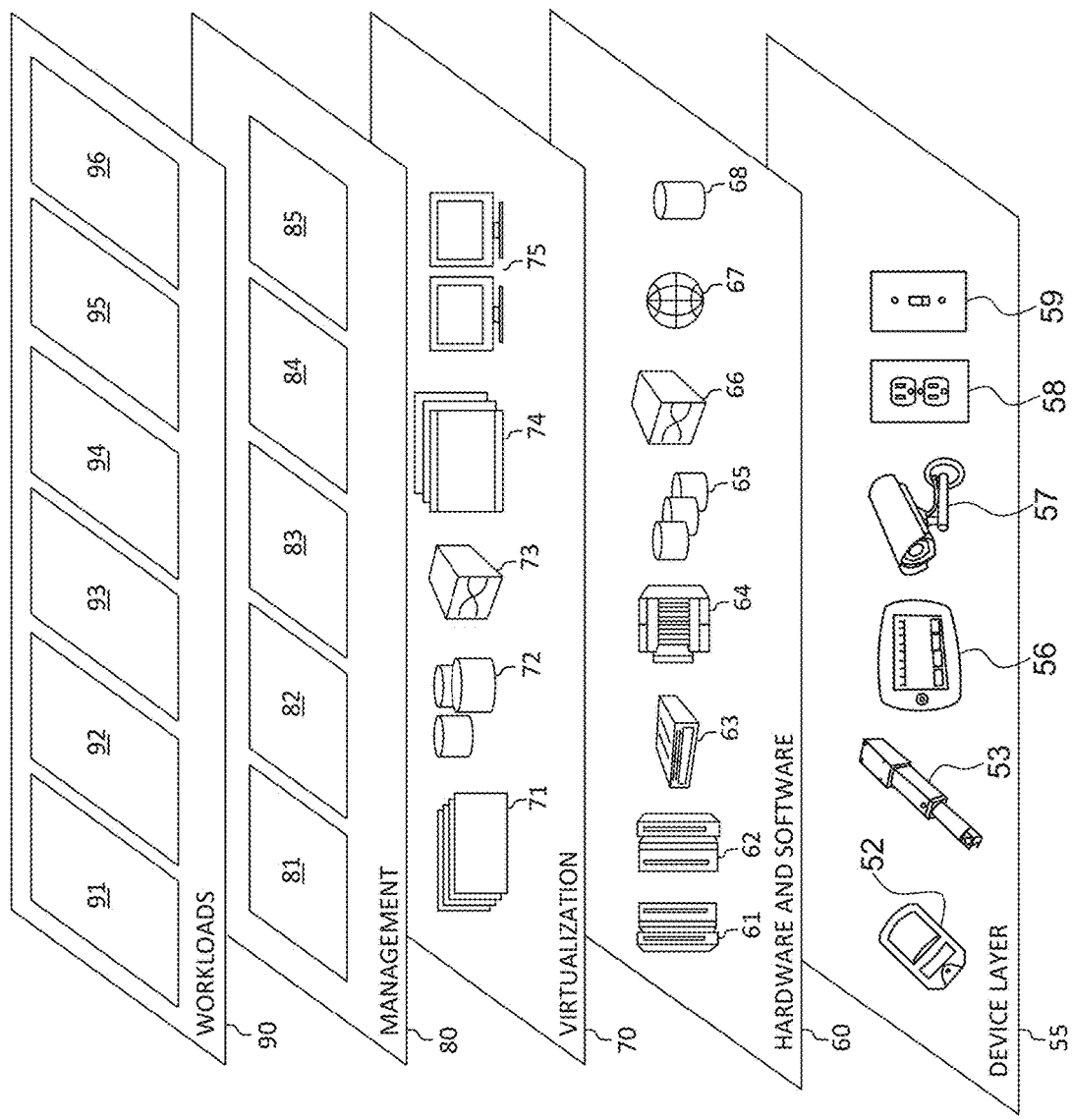
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Device layer 55 includes physical and/or virtual devices, embedded with and/or standalone electronics, sensors, actuators, and other objects to perform various tasks in a cloud computing environment 50. Each of the devices in the device layer 55 incorporates networking capability to other functional abstraction layers such that information obtained from the devices may be provided thereto, and/or information from the other abstraction layers may be provided to the devices. In one embodiment, the various devices inclusive of the device layer 55 may incorporate a network of entities collectively known as the "internet of things" (IoT). Such a network of entities allows for intercommunication, collection, and dissemination of data to accomplish a great variety of purposes, as one of ordinary skill in the art will appreciate.

Device layer 55 as shown includes sensor 52, actuator 53, "learning" thermostat 56 with integrated processing, sensor, and networking electronics, camera 57, controllable household outlet/receptacle 58, and controllable electrical switch 59 as shown. Other possible devices may include, but are not limited to various additional sensor devices, networking devices, electronics devices (such as a remote-control device), additional actuator devices, so called "smart" appliances such as a refrigerator or washer/dryer, and a wide variety of other possible interconnected objects.

Hardware and software layer 60 includes hardware and software components. Examples of hardware components include: mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, in the context of the illustrated embodiments of the present invention, various workloads and functions 96 for automated time series forecasting pipeline generation with data allocation and data caching in a computing environment (e.g., in a neural network architecture). In addition, workloads and functions 96 for automated time series forecasting pipeline generation with data allocation and data caching in a computing environment may include such operations as analytics, deep learning, and as will be further described, user and device management functions. One of ordinary skill in the art will appreciate that the workloads and functions 96 for automated time series forecasting pipeline generation with data allocation and data caching in a computing environment may also work in conjunction with other portions of the various abstractions layers, such as those in hardware and software 60, virtualization 70, management 80, and other workloads 90 (such as data analytics processing 94, for example) to accomplish the various purposes of the illustrated embodiments of the present invention.

As previously stated, the present invention provides novel solutions for providing automated time series forecasting machine learning pipeline generation in a computing environment by one or more processors in a computing system. A data allocation size of time series data may be determined based on one or more characteristics of a time series data set. The time series data may be allocated for use by candidate machine learning pipelines based on the data allocation size. Features for the time series data may be determined and cached by the candidate machine learning pipelines. Predictions of each of the candidate machine learning pipelines using at least the one or more features may be evaluated. A ranked list of machine learning pipelines may be automatically generated from the candidate machine learning pipelines for time series forecasting based upon evaluating predictions of each of the one or more candidate machine learning pipelines.

In an additional aspect, various embodiments are provided herein to generate ranked machine learning pipelines for time series forecasting, according to selection criterion for automated ML systems, which take as input: time series data, candidate pipelines, user preference information (optional). A list of ranked machine learning pipelines may be provided as output in the computing system. In one aspect, data allocation is determined and the time series data is allocated. One or more features may be computed and cached and each machine learning pipeline may be updated with one or more of the features. The machine learning pipelines may be evaluated.

The data allocation size may be determined based on input time series, using time series specific techniques such as seasonality detection. The transformers of the machine learning pipelines may include local and global transformers. Local transformers may only require a limited or defined amount of historical data for feature calculation whereas the global transformers may require all data for feature calculation.

The subsequent data allocation may be a strict superset of previous data allocations. Input time series is not shuffled. Rather, the original sequential order of input time series is maintained and unchanged during data allocation. Final estimators may be partially refit with newly computed features, in this case no cached features are needed. Precomputed features may be cached at the final estimator of the pipeline. The first transformer in the pipeline caches the first window of last allocation, which later is used for feature computation in the next allocation Turning now to FIG. 4, a block diagram depicting exemplary functional components of system 400 for automated time series forecasting pipeline generation with data allocation and data caching in a computing environment (e.g., in a neural network architecture) according to various mechanisms of the illustrated embodiments is shown. In one aspect, one or more of the components, modules, services, applications, and/or functions described in FIGS. 1-3 may be used in FIG. 4. As will be seen, many of the functional blocks may also be considered "modules" or "components" of functionality, in the same descriptive sense as has been previously described in FIGS. 1-3.

A automated time series forecasting machine learning pipeline generation service 410 is shown, incorporating processing unit 420 ("processor") to perform various computational, data processing and other functionality in accordance with various aspects of the present invention. In one aspect, the processor 420 and memory 430 may be internal and/or external to the automated time series forecasting machine learning pipeline generation service 410, and internal and/or external to the computing system/server 12. The automated time series forecasting machine learning pipeline generation service 410 may be included and/or external to the computer system/server 12, as described in FIG. 1. The processing unit 420 may be in communication with the memory 430. The automated time series forecasting machine learning pipeline generation service 410 may include a machine learning component 440, an allocation component 450, an evaluation component 460, an joint optimizer component, and a caching component 480.

In one aspect, the system 400 may provide virtualized computing services (i.e., virtualized computing, virtualized storage, virtualized networking, etc.). More specifically, the system 400 may provide virtualized computing, virtualized storage, virtualized networking and other virtualized services that are executing on a hardware substrate.

In one aspect, the machine learning component 440 may receive, identify, and/or select a machine learning model and/or machine learning pipeline, a dataset for a data set (e.g., a time series data set) used for testing the machine learning model and/or machine learning pipeline.

The machine learning component 440, in association with the allocation component 450, the evaluation component 460, the joint optimizer component 470, and the caching component may automatically generate time series forecasting pipelines with data allocation and data caching in a computing system is provide.

The machine learning component 440, in association with the allocation component 450, may determine the data allocation size of time series data based on one or more characteristics of a time series data set. The machine learning component 440, in association with the allocation component 450, may allocate the time series data for use by one or more candidate machine learning pipelines based on the data allocation size.

The machine learning component 440, in association with the allocation component 450, the evaluation component 460, the joint optimizer component 470, and the caching component 480 may determine and cache one or more features for the time series data by the one or more candidate machine learning pipelines.

The machine learning component 440, in association with the evaluation component 460, may evaluate predictions of each of the one or more candidate machine learning pipelines using at least the one or more features.

The machine learning component 440, in association with the allocation component 450, the evaluation component 460, the joint optimizer component 470, and the caching component 480 may automatically generating a ranked list of machine learning pipelines from the one or more candidate machine learning pipelines for time series forecasting based upon evaluating predictions of each of the one or more candidate machine learning pipelines.

The machine learning component 440, in association with the allocation component 450, may use a sequential order of the time series data set while allocating the time series data based on the data allocation size. The machine learning component 440, in association with the allocation component 450, may determine and/or identify holdout data set, a test data set, and a training data set from the time series data for allocating the time series data. The machine learning component 440, in association with the allocation component 450, may allocate the time series data backward in time.

In another embodiment, the machine learning component 440, in association with the allocation component 450, the evaluation component 460, the joint optimizer component 470, and the caching component 480 may train and evaluate candidate machine learning pipelines using the time series data, the hold data set, a test data set, and a training data set from the time series data.

In another embodiment, the machine learning component 440, in association with the allocation component 450, the evaluation component 460, the joint optimizer component 470, and the caching component 480 may combine one or more features with previously determined features for use by the one or more candidate machine learning pipelines and the features may be cached at a final estimator of the one or more candidate machine learning pipelines.

In one aspect, the machine learning component 440 as described herein, may perform various machine learning operations using a wide variety of methods or combinations of methods, such as supervised learning, unsupervised learning, temporal difference learning, reinforcement learning and so forth. Some non-limiting examples of supervised learning which may be used with the present technology include AODE (averaged one-dependence estimators), artificial neural network, backpropagation, Bayesian statistics, naive bays classifier, Bayesian network, Bayesian knowledge base, case-based reasoning, decision trees, inductive logic programming, Gaussian process regression, gene expression programming, group method of data handling (GMDH), learning automata, learning vector quantization, minimum message length (decision trees, decision graphs, etc.), lazy learning, instance-based learning, nearest neighbor algorithm, analogical modeling, probably approximately correct (PAC) learning, ripple down rules, a knowledge acquisition methodology, symbolic machine learning algorithms, sub symbolic machine learning algorithms, support vector machines, random forests, ensembles of classifiers, bootstrap aggregating (bagging), boosting (meta-algorithm), ordinal classification, regression analysis, information fuzzy networks (IFN), statistical classification, linear classifiers, fisher's linear discriminant, logistic regression, perceptron, support vector machines, quadratic classifiers, k-nearest neighbor, hidden Markov models and boosting. Some non-limiting examples of unsupervised learning which may be used with the present technology include artificial neural network, data clustering, expectation-maximization, self-organizing map, radial basis function network, vector quantization, generative topographic map, information bottleneck method, IBSEAD (distributed autonomous entity systems based interaction), association rule learning, apriori algorithm, eclat algorithm, FP-growth algorithm, hierarchical clustering, single-linkage clustering, conceptual clustering, partitional clustering, k-means algorithm, fuzzy clustering, and reinforcement learning. Some non-limiting example of temporal difference learning may include Q-learning and learning automata. Specific details regarding any of the examples of supervised, unsupervised, temporal difference or other machine learning described in this paragraph are known and are within the scope of this disclosure. Also, when deploying one or more machine learning models, a computing device may be first tested in a controlled environment before being deployed in a public setting. Also even when deployed in a public environment (e.g., external to the controlled, testing environment), the computing devices may be monitored for compliance.

Turning now to FIG. 5, a block diagram depicts a machine learning pipeline 500 in a computing environment. In one aspect, one or more of the components, modules, services, applications, and/or functions described in FIGS. 1-4 may be used in FIG. 5. As shown, various blocks of functionality are depicted with arrows designating the blocks' of system 500 relationships with each other and to show process flow (e.g., steps or operations). Additionally, descriptive information is also seen relating each of the functional blocks' of system 500. As will be seen, many of the functional blocks may also be considered "modules" of functionality, in the same descriptive sense as has been previously described in FIGS. 1-4. With the foregoing in mind, the module blocks' of system 500 may also be incorporated into various hardware and software components of a system for automated evaluation of machine learning models in a computing environment in accordance with the present invention. Many of the functional blocks of system 500 may execute as background processes on various components, either in distributed computing components, or elsewhere.

In one aspect, a machine learning pipeline 500 may refer to a workflow including a series of transformers such as, for example, transformer 510, 520 (e.g., a window transformer "transformer", an imputer "transformer 2") and one or more estimators such as, for example, a final estimator 530 (e.g., outputs).

Figure 6:
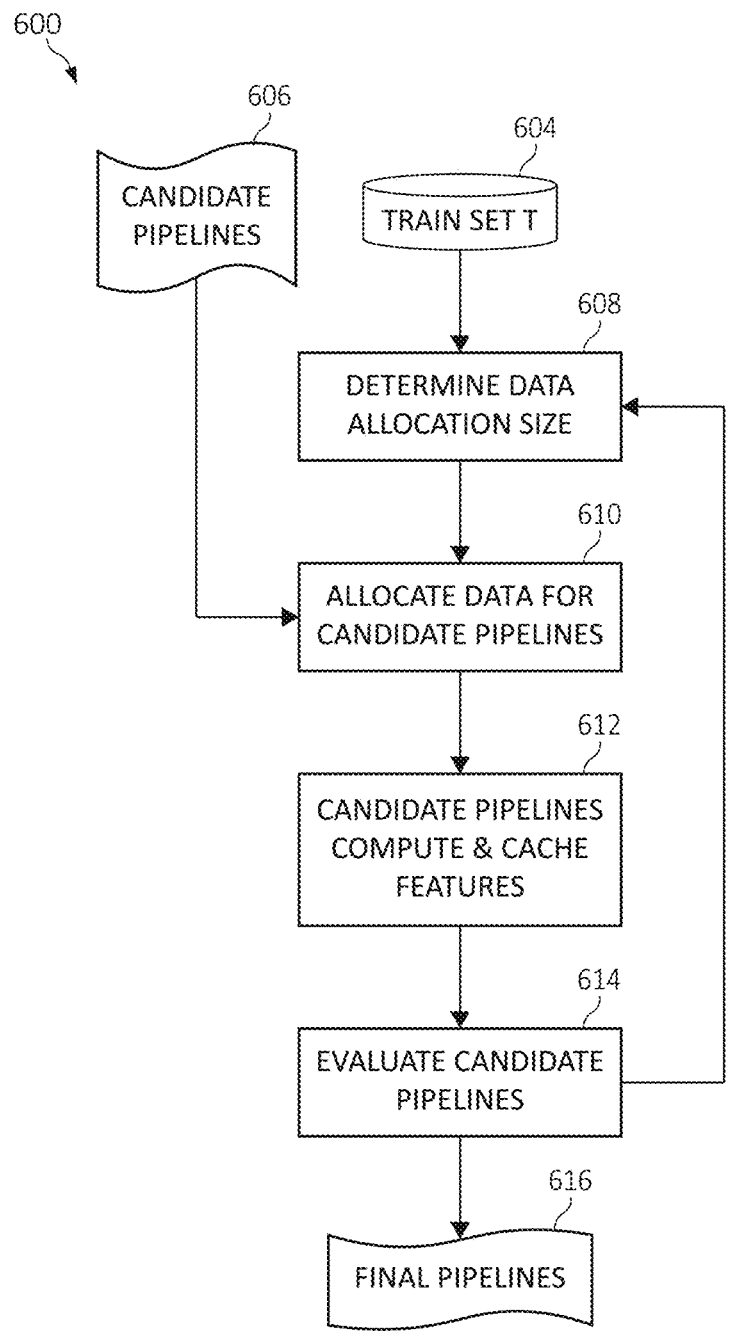
FIG. 6 is a flowchart diagram depicting an exemplary method for automated time series forecasting pipeline generation with data allocation and data caching in a computing environment, by a processor, in which aspects of the present invention may be realized.

Turning now to FIG. 6, a method 600 for automated time series forecasting pipeline generation with data allocation and data caching in a computing environment using a processor is depicted, in which various aspects of the illustrated embodiments may be implemented. The functionality 600 may be implemented as a method (e.g., a computer-implemented method) executed as instructions on a machine, where the instructions are included on at least one computer readable medium or one non-transitory machine-readable storage medium. The functionality 600 may start with candidate machine learning pipelines 606 and a time series data set ("T") being received as input. A data allocation size may be determined, as in block 608. The training data may be allocated to the candidate machine learning pipelines, as in block 610. The candidate machine learning pipelines may determine/compute one or more features and cache the features, as in block 612. Each of the candidate machine learning pipelines may be evaluated, as in block 614. One or more "final" machine learning pipelines may be identified, determined and/or selected based on the evaluations, as in block 616.

In one aspect, employing one or more operations of FIG. 6, a joint optimizer (see joint optimizer 470 of FIG. 4) may step 1) take the time series training data set "T" and candidate pipelines as input, and determine a time series specific data allocation size on train set T (e.g., determine a data size allocation. In step 2, the joint optimizer may perform time series specific data allocation for candidate machine learning pipelines.

In step 3, the candidate machine learning pipelines determine/compute features for new data in a current allocation of time series data from the originally received training set, combine previously cached features with newly computed features, cache combined features for future use, and update final estimators of each of the candidate machine learning pipelines.

In step 4, the joint optimizer may evaluate candidate machine learning pipelines based on prediction outcome. Each of the steps of 1-4 may be repeated until the training dataset "T" is fully allocated.

In step 5, the joint optimizer may output, determine, and/or rank final, best/optimized machine learning pipelines for time series forecasting.

In this way, embodiments of the present invention combines a new data allocation scheme/operation at the joint optimizer level and a data caching scheme/operation at the pipeline level for automated time series forecasting pipeline generation. The advantages of the embodiments of the present invention include, but not limited to 1), an improved time series specific data allocation scheme at joint optimizer (i.e., data allocation size computation, backward in time data allocation), decreased/shorter transformed features computation time at the machine learning pipeline level when data caching is enabled, and a decreased/shorter machine learning pipeline retraining time when partial fit is enabled for final estimators of the machine learning pipelines.

Furthermore, the advanced joint optimizer, as described herein, is not limited to only using fixed data allocation size and includes a time series specific data allocation schemes. That is, the time series specific joint optimizer may 1) automate data size allocation (e.g., allocated data size is not fixed) and the data size allocation may adaptively depend on characteristics of input time series such as seasonality patterns, trending patterns. The time series specific joint optimizer may define a fixed holdout set, fixed test set, and train set from input time series, allocates training data for candidate pipelines backward in time. The time series specific joint optimizer may train and evaluates candidate machine learning pipelines on the allocated training set and the fixed test set to find potentially best candidates for next data allocation.

Figure 7:
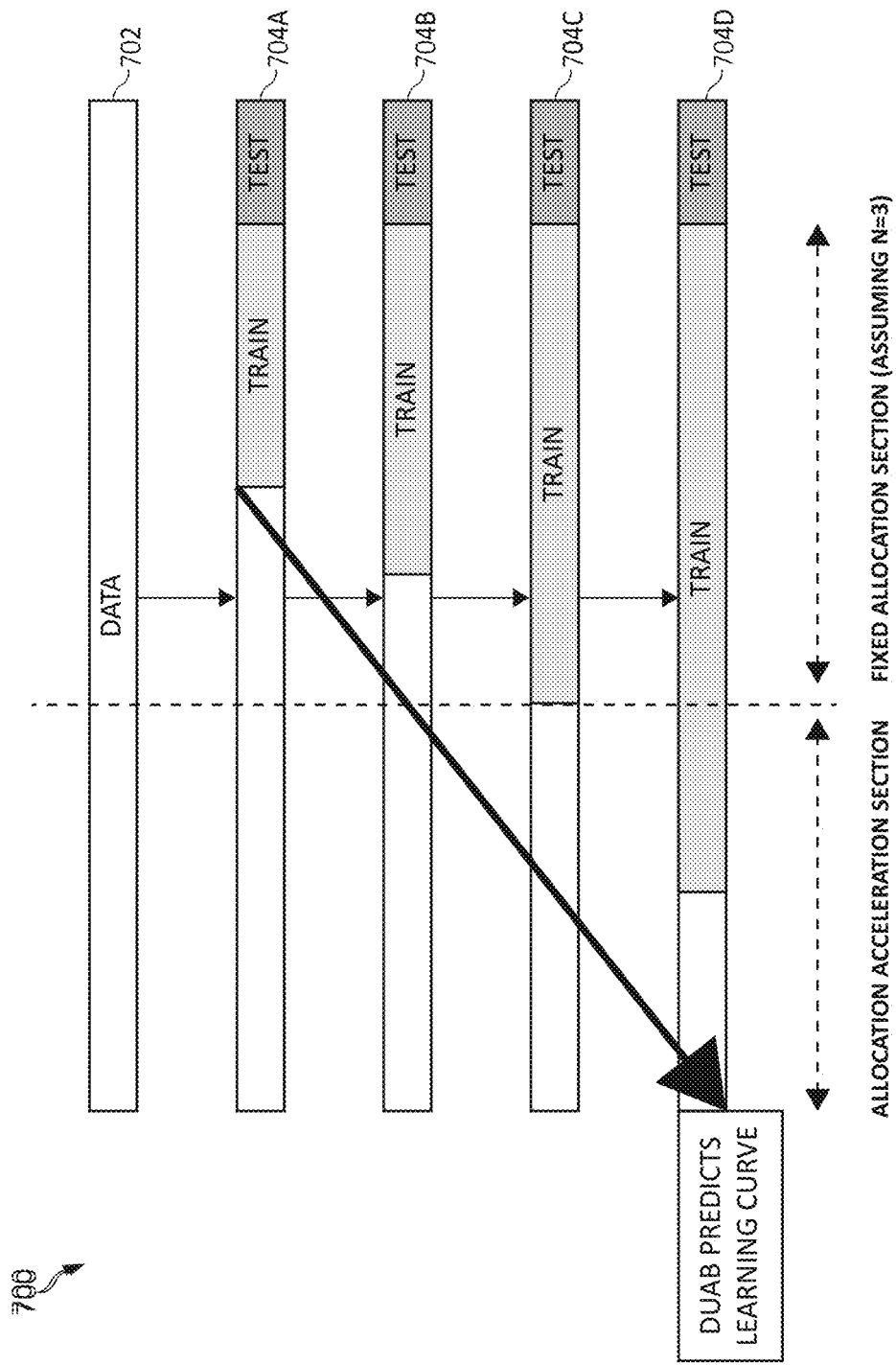
FIG. 7 is block diagram depicting an exemplary system and functionality for joint optimization for automated time series forecasting pipeline generation in a computing environment, by a processor, in which aspects of the present invention may be realized.

Turning now to FIG. 7, block diagram 700 depicts an exemplary system 700 and functionality for joint optimization for automated time series forecasting pipeline generation in a computing environment. As shown, various blocks of functionality are depicted with arrows designating the blocks' of system 700 relationships with each other and to show process flow (e.g., steps or operations). Additionally, descriptive information is also seen relating each of the functional blocks' of system 700. As will be seen, many of the functional blocks may also be considered "modules" of functionality, in the same descriptive sense as has been previously described in FIGS. 1-6. With the foregoing in mind, the module blocks' of system 700 may also be incorporated into various hardware and software components of a system for automated time series forecasting machine learning pipeline generation in a computing environment in accordance with the present invention. Many of the functional blocks 700 may execute as background processes on various components, either in distributed computing components, or elsewhere.

As depicted, a data allocation schema for joint optimization for automated time series forecasting pipeline generation. As depicted, a training data set 702 (e.g., a time series data set) is received and takes a selected portion (e.g., a last/final or "right most" section) of the training data set 702 as a test set ("test") and then sequentially allocates a small subset of training data backwards.

Figure 4:
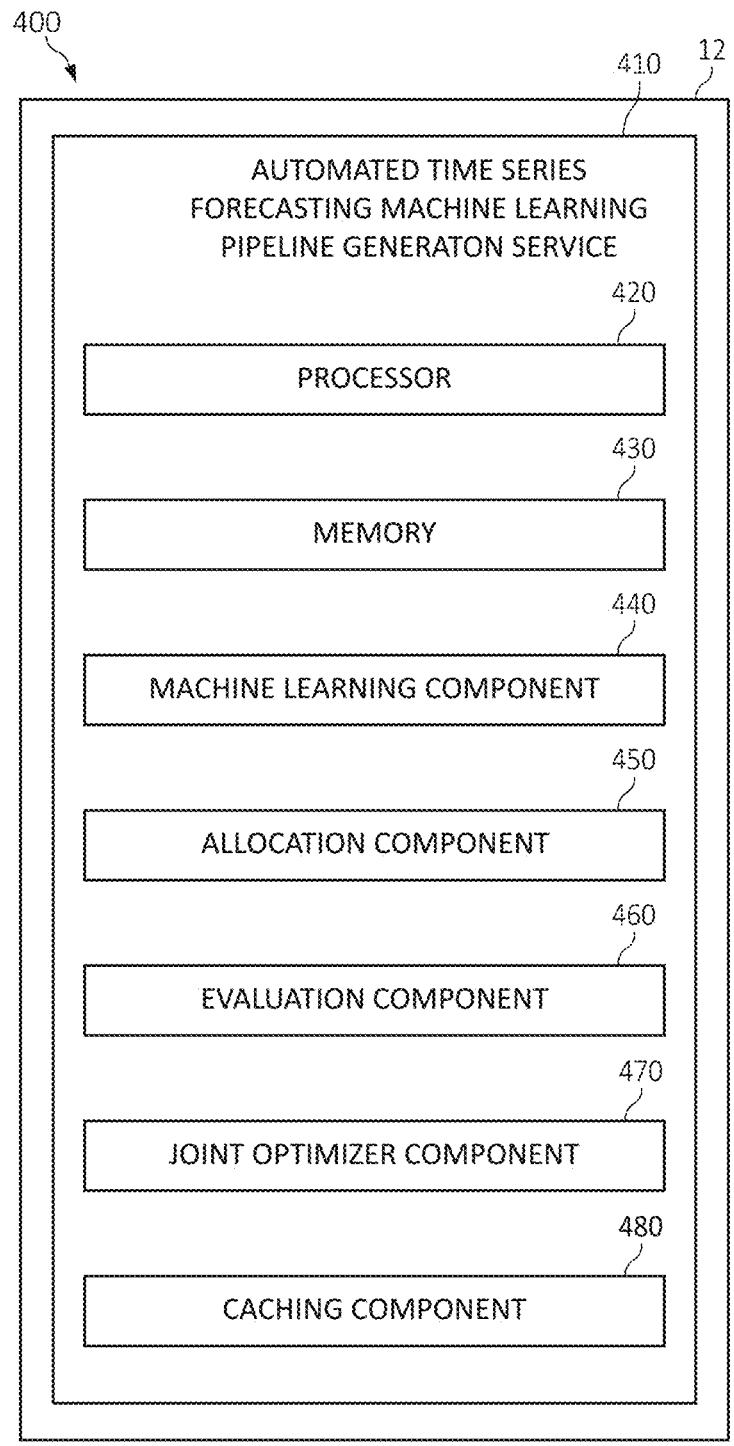
FIG. 4 is an additional block diagram depicting an exemplary functional relationship between various aspects of the present invention.

A joint optimizer such as, for example, the joint optimizer component 470 of FIG. 4, may employ a time series Data Allocation Upper Bound ("TDAUB") operation. In one aspect, the TDAUB operation is the joint optimizer that sequentially allocates one or more subsets of an allocated sized (e.g., a small subsets) of the training data set 702 amongst a large set of machine learning pipelines such as, for example, machine learning pipelines 704A-D. The execution and evaluation of each of the machine learning pipelines 704A-D may be performed based on a priority queue and the more promising pipeline (e.g., machine learning pipeline 704D) is expected to compete first. The joint optimization operation (e.g., TDAUB operation) may be conducted on each transformer and estimators of the preselected pipelines such as, for example, the machine learning pipelines 704A-D. The joint optimization may include the TDAUB operation, ADMM, and/or continuous joint optimization.

In one aspect, the specific data allocation size of the time series data may be determined and/or calculated. In one aspect, using seasonality detection, in a first step, the input time series data may be a de-trended and de-leveled. In a second step, one or more operation such as, for example, a Fast Fourier Transformation ("FFT"), may be applied on the de-trended and de-leveled data. In a third step, a spectrum may be computed. For example, assume that after the FFT operation, an, $$\frac{n}{2}$$

complex number is obtained such as, for example, as illustrated in equation 1:

$$a_1 + b_1 i, \ldots, a_{\frac{n}{2}} + b_{\frac{n}{2}} i \qquad (1)$$

where $$i^2 = -1 \qquad (2)$$

and n is a number of allocations.

The spectrums may be determined/computed using the equation:

$$Sp_k = \sqrt{a_k^2 + b_k^2}, K = 1, \ldots, \frac{n}{2}. \qquad (3)$$

where $Sp_k$ is a seasonal length of the time series data.

As such, in a fourth step, a seasonal length $Sp_k$ may be selected. In a fifth step, a data allocation size may be determined where the is equal to:

$$C * Sp_k, \qquad (4)$$

where C is a pre-selected integer. In this way, the data allocation size may be selected/determined based on a seasonal length and assures each data allocation operation at least covers/includes one full seasonal cycle of the time series data.

Additionally, for the TDAUB operation may also include the following. In one aspect, a total length of input time series data may be denoted as "L" and a number of pipelines as "np". The DAUB executes if, for example, the total length of input time series data is greater than a minimum allocation size ("min_allocation_size") (e.g., "L>min_allocation_size"), where the minimum allocation size ("min_allocation_size") is a threshold chosen a priori to trigger the TDAUB.

In one aspect, the minimum data allocation size ("min_allocation_size") may be the minimum data allocation amount if data is less than 1K and the pipelines are evaluated using an entire data and may also be an optional user input.

For the fixed allocation section, the following operation may be performed.

In step 1.1, the minimum allocation size ("min_allocation_size") data may be allocated to each machine learning pipeline such as, for example, machine learning pipelines 704A-D starting from most recent data (e.g., machine learning pipelines 704A). The initial data allocation may be divided/splint into a training set ("train") and a test set ("test"). The machine learning pipelines 704A-D may be trained on the training set and then each of the machine learning pipelines 704A-D may be scored on the test set. The score ("score 1") may be recorded for each of the machine learning pipelines 704A-D.

In step 1.2, additional and incremented data (e.g., allocation_increment data) may be allocated backwards in time to each pipeline such as, for example, machine learning pipelines 704A-D. Each of the machine learning pipelines 704A-D may be trained on the training set and a score may be determined for each of the machine learning pipelines 704A-D on the test set. The score ("score 2") may be recorded for each of the machine learning pipelines 704A-D.

In one aspect, the allocation_increment may be an allocation amount based on seasonality. The seasonality of the time series data may be estimated using Fast Fourier Transformation. The allocation_increment may be set as equal to the seasonality length (e.g., allocation_increment=seasonality length). In one aspect, if the training data only includes small number of seasonal length, the allocation_increment may be set equal to the seasonality length that is divided by the number of allocations (e.g., allocation_increment=seasonality length/number of desired allocations). Also, the allocation may be based on temporal dependency. The number of correlated lags may be estimated using criteria methods "AIC" and "BIC. The allocation_increment may be set equal to the pre-selected integer multiplied by the number of significant lags (e.g., allocation_increment=C*number of significant lags).

In step 1.3, a fixed allocation cutoff ("fixed_allocation_cutoff") may be indicated/denoted as an n number of times of allocation_increment backward after the test set, i.e. n=(fixed_allocation_cutoff/allocation_increment). Step 1.3 may be repeated for n−1 times.

After the fixed allocation portion, a vector ("V") of scores [score 1, . . . score n] may be collected and gathered for each pipeline corresponding to sample size [min_allocation_size, min_allocation_size+allocation_increment, . . . , fixed_allocation_cutoff].

In step 1.4, for each pipeline, a regression fit may be performed on target variables scores V's predictor sample sizes. A score may be predicted when a sample size is equal to total length of input time series data "L." A predicted score vector may be denoted as $[s_1, s_2, \ldots s_{np}]$, corresponding to pipeline 1, pipeline 2, . . . , pipeline np such as, for example, machine learning pipelines 704A-D.

In step 1.5. the predicted score vectors $[S_1, S_2, \ldots, S_{np}]$ may be ranked from a minimum ("min") to a maximum ("max") assuming that the smaller score is, the more accurate the pipeline is. The ranked score vectors may be denoted as $[S'_1, S'_2, \ldots, S'_{np}]]$, and the corresponding pipelines may be maintained in a priority queue.

In the allocation acceleration section/part, not all of the machine learning pipelines will receive the additional data allocation. Rather, only the top machine learning pipeline will receive the additional data allocation. The additional data allocation will be increasing geometrically. For example, rounded_inc_mult=int
   (last_allocation*initial_geo_allocation_increment))/
   allocation_increment.

next_allocation=int
   (rounded_inc_mult*allocation_increment)

In step 2.1, additional next_allocation data points may be allocated to a top/optimized machine learning pipeline (e.g., machine learning pipeline 704D) in the priority queue. Given the same testing set as previously used, the machine learning pipeline 704D may be trained on the training set and the pipeline (e.g., machine learning pipeline 704D) may be scored on the testing set. The new score may be recorded into the score vector of this top pipeline (e.g., the machine learning pipeline 704D). A linear regression may be applied to refit on the updated scores Vs predictor sample sizes. A score may be predicted when a sample size is equal to L (e.g., the total length of input time series data).

In step 2.2, a previously obtained score of the top/optimized pipeline (e.g., the machine learning pipeline 704D) may be replaced in the ranked score vector by the newly predicted one. The score vectors may be reranked and the corresponding priority queue may be updated.

In step 2.3, each of the steps 2.1-2.2 may be repeated until no further data can be allocated.

It should be noted that the TDAUB operation is typically executed for multiple times on multiple test sets. The result is combined by majority voting.

As depicted in FIG. 7, a learning curve may be predicted by the DUAB. In one aspect, for early learning curve projection, a machine learning model that results in "similar error distribution" on internal test dataset even after allocating more data point suggests the following. The machine learning model 1) has already acquired the learning with no additional benefits, 3) early decision to either instruct machine learning model to change some parameter if its performance is significantly poor, 3) "Introduction of an early feedback in Competition"—providing an increased chance to boost the performance of a pipeline that is performing less than desired. For example, assume pipeline A has adjusted one or more parameters based on the data given in a first round of data allocation. Assume also that a parameter setting is not achieving a desired result. Thus an early feedback may result in an opportunity for a pipeline to adjust the parameter prior to completion of an initial 5 round of data allocation.

Additionally, since internal test data does not change, similar error distribution may be applied to permit a comparison operation to compare the effects of allocating more data points with respect to the error that are generated.

Figure 8:
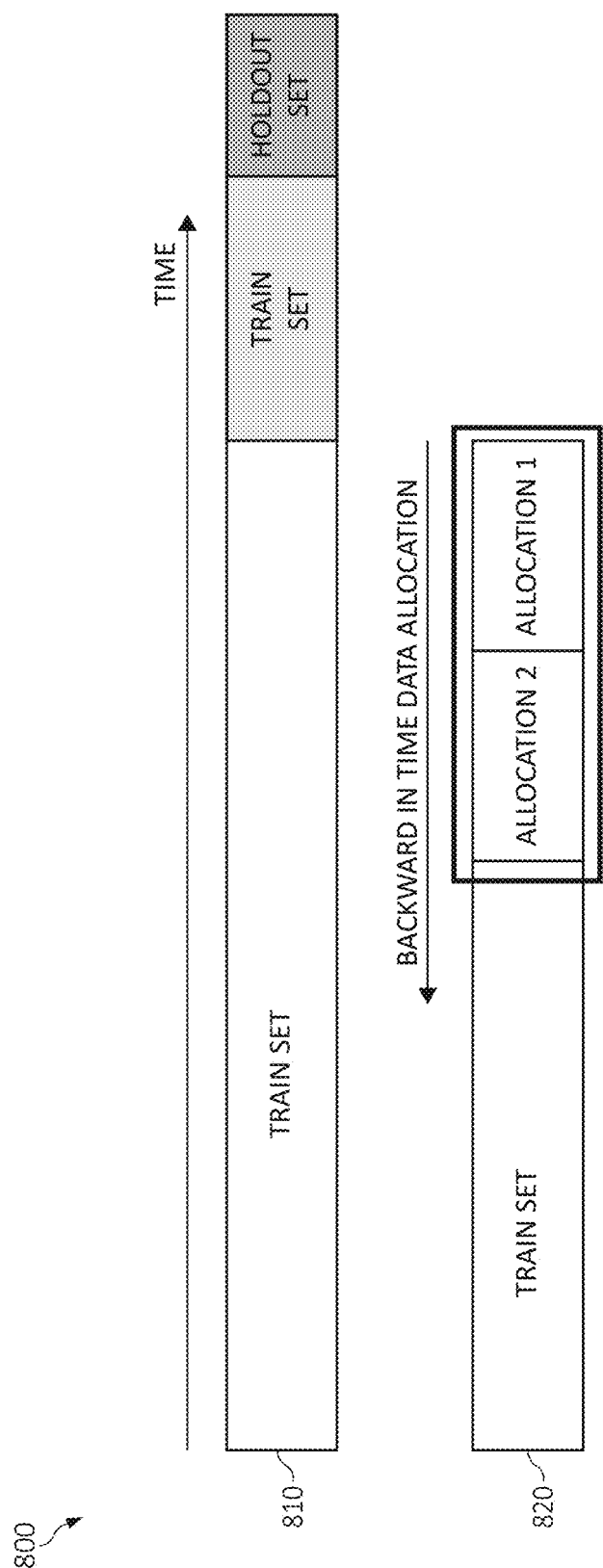
FIG. 8 is a block diagram depicting an exemplary operation of time series data allocation in a computing environment, by a processor, in which aspects of the present invention may be realized.

Turning now to FIG. 8, a block diagram depicts an exemplary operation 800 for time series data allocation in a computing environment by a processor. In one aspect, one or more of the components, modules, services, applications, and/or functions described in FIGS. 1-7 may be used in FIG. 8.

In one aspect, time series data 810 may be divided into a holdout set, a test set, and a train set. The holdout set and test set may be fixed and may be at the right most end (latest in time) of input dataset (in relation to time). A data allocation operation may allocated the time series data 810 backward in time for the train set, and may be given to all candidate pipelines such as, for example, candidate machine learning pipeline 820. Allocation 2 may be allocated after allocation 1, so allocation 2 is a strictly superset of allocation 1. Each candidate pipeline such as, for example, candidate machine learning pipeline 820 are always are given a fixed test set adjacent to and immediately after the training set in relation to time. For example, allocation 2 is the training set and is provided right before the fixed test set.

It should be noted that the mechanism of the illustrated embodiments provide advantages of existing automated machine learning pipelines that only perform a calculation of transformations and refit the final estimator with computed transformed features entirely and provide no feature caching or partial fit on final estimators.

In contrast, the mechanism of the illustrated embodiments provide time series specific machine learning pipelines have that determine/compute features for new data in a current allocation, but not the entire data allocation, which increases computing efficiency and saves time. In so doing, the data allocation scheme in the joint optimizer ensures that current allocation is a superset of previous allocations. Also, previously computed features may be combined with newly computed features for a final estimator (see FIG. 5). The combined features may be cached for subsequent allocations. An update operation may be performed on the final estimator by using partial fit sklearn function (if possible), rather than rebuilding the final estimator with the entire combined features from scratch.

In one aspect, come features such as, for example, trend features can be only computed with the entire dataset. These may be referred to as global features of the time series data. Since the joint optimizer can access the entire train set, these global features may be determined/computed by the joint optimizer and then provided to all pipelines. The machine learning pipelines may then only focus on computation and caching for 'local' features that only require a window of time series data.

In relation to computation and caching of local feature, since the joint optimizer allocates training data backward in time, the candidate machine learning pipelines may cache a first window of time series data in the last allocation. The first window of last allocation may be cached at first transformer of the candidate machine learning pipeline. Once a new allocation arrives, only the new data portion of the new allocation may be consumed by transformers to compute new features. The first window of last allocation is used to recompute and correct features for that window in last allocation since previously computed features for that window might be with NaN values. Newly computed features and cached features are combined at the final estimator. A final estimator caches combined features for future use.

In relation to updating the final estimator of the machine learning pipeline, one or more features may be transformed by transformers and fit by final estimator. In one aspect, ensemble estimators, deep learning estimators, and several sklearn estimators may support a partial_fit( ) operation that can be used to update final estimators with only newly computed features. For these estimators, the mechanisms of the illustrated embodiments do not need to cache previously computed features and only call partial_fit( ) on newly computed features. For estimators that do not have partial_fit( ) method, the estimators may be refit on combined features, so caching of combined features is needed.

Figure 9:
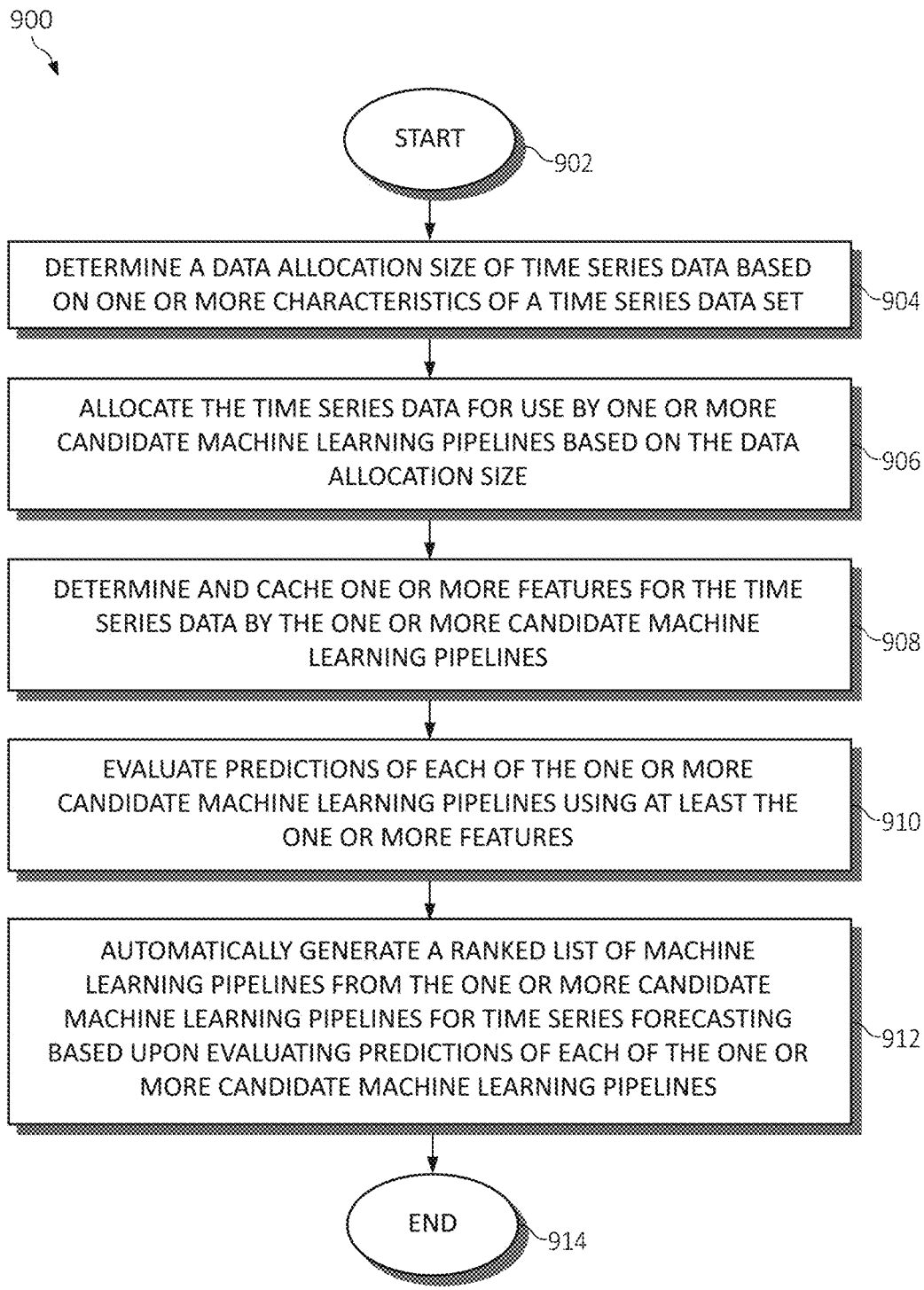
FIG. 9 is an additional flowchart diagram depicting an additional exemplary method for automated time series forecasting pipeline generation with data allocation and data caching in a computing environment by a processor in a computing environment, by a processor, in which aspects of the present invention may be realized.

Turning now to FIG. 9, a method 900 for automated time series forecasting pipeline generation with data allocation and data caching in a computing environment using a processor is depicted, in which various aspects of the illustrated embodiments may be implemented. The functionality 900 may be implemented as a method (e.g., a computer-implemented method) executed as instructions on a machine, where the instructions are included on at least one computer readable medium or one non-transitory machine-readable storage medium. The functionality 900 may start in block 902.

A data allocation size of time series data may be determined based on one or more characteristics of a time series data set, as in block 904. The time series data may be allocated for use by one or more candidate machine learning pipelines based on the data allocation size, as in block 906. One or more Features for the time series data may be determined and cached by the one or more candidate machine learning pipelines, as in block 908. Predictions of each of the one or more candidate machine learning pipelines using at least the one or more features may be evaluated, as in block 910. A ranked list of machine learning pipelines may be automatically generated from the candidate machine learning pipelines for time series forecasting based upon evaluating predictions of each of the one or more candidate machine learning pipelines, as in block 912. The functionality 900 may end, as in block 914.

In one aspect, in conjunction with and/or as part of at least one blocks of FIG. 9, the operations of method 900 may include each of the following. The operations of 900 may use a sequential order of the time series data set while allocating the time series data based on the data allocation size, and/or determine a holdout data set, a test data set, and a training data set from the time series data for allocating the time series data.

The operations of 900 may train and evaluate the one or more candidate machine learning pipelines using the time series data, the hold data set, a test data set, and a training data set from the time series data, and/or allocate the time series data backward in time.

The operations of 900 may combine the one or more features with previously determined features for use by the one or more candidate machine learning pipelines. The operations of 900 may cache the one or more features at a final estimator of the one or more candidate machine learning pipelines.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowcharts and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowcharts and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowcharts and/or block diagram block or blocks.

The flowcharts and block diagrams in the Figures illustrate the architecture, functionality, and operation of possible implementations of systems, methods, and computer program products according to various embodiments of the present invention. In this regard, each block in the flowcharts or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

The descriptions of the embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for automated time series forecasting machine learning pipeline generation in a computing environment by one or more processors comprising:

determining a data allocation size of time series data based on one or more characteristics of a time series data set;

executing machine learning logic to allocate the time series data to one or more candidate machine learning pipelines based on the data allocation size, wherein a sequential order of the time series data set is used while allocating the time series data based on the data allocation size;

executing the machine learning logic to train the one or more candidate machine learning pipelines using selected data associated with the time series data set;

executing the machine learning logic to determine and cache one or more features for the time series data by the one or more candidate machine learning pipelines;

evaluating predictions of each of the one or more candidate machine learning pipelines using at least the one or more features; and automatically generating a ranked list of machine learning pipelines from the one or more candidate machine learning pipelines for time series forecasting based upon evaluating predictions of each of the one or more candidate machine learning pipelines.

2. The method of claim 1, further including determining a holdout data set, a test data set, and a training data set from the time series data for allocating the time series data.

3. The method of claim 1, further including evaluating the trained one or more candidate machine learning pipelines using the time series data, a hold data set, a test data set, and a training data set from the time series data.

4. The method of claim 1, further including allocating the time series data backward in time.

5. The method of claim 1, further including combining the one or more features with previously determined features for use by the one or more candidate machine learning pipelines.

6. The method of claim 1, further including caching the one or more features at a final estimator of the one or more candidate machine learning pipelines.

7. A system for automated time series forecasting machine learning pipeline generation in a computing environment, comprising:
one or more computers with executable instructions that when executed cause the system to:
determine a data allocation size of time series data based on one or more characteristics of a time series data set;
execute machine learning logic to allocate the time series data to one or more candidate machine learning pipelines based on the data allocation size, wherein a sequential order of the time series data set is used while allocating the time series data based on the data allocation size;
execute the machine learning logic to train the one or more candidate machine learning pipelines using selected data associated with the time series data set;
execute the machine learning logic to determine and cache one or more features for the time series data by the one or more candidate machine learning pipelines;
evaluate predictions of each of the one or more candidate machine learning pipelines using at least the one or more features; and
automatically generate a ranked list of machine learning pipelines from the one or more candidate machine learning pipelines for time series forecasting based upon evaluating predictions of each of the one or more candidate machine learning pipelines.

8. The system of claim 7, wherein the executable instructions when executed cause the system to determine a holdout data set, a test data set, and a training data set from the time series data for allocating the time series data.

9. The system of claim 7, wherein the executable instructions when executed cause the system to evaluate the trained one or more candidate machine learning pipelines using the time series data, a hold data set, a test data set, and a training data set from the time series data.

10. The system of claim 7, wherein the executable instructions when executed cause the system to allocate the time series data backward in time.

11. The system of claim 7, wherein the executable instructions when executed cause the system to combine the one or more features with previously determined features for use by the one or more candidate machine learning pipelines.

12. The system of claim 7, wherein the executable instructions when executed cause the system to cache the one or more features at a final estimator of the one or more candidate machine learning pipelines.

13. A computer program product for automated time series forecasting machine learning pipeline generation in a computing environment, the computer program product comprising:
one or more computer non-transitory readable storage media, and program instructions collectively stored on the one or more non-transitory computer readable storage media, the program instructions comprising:
program instructions to determine a data allocation size of time series data based on one or more characteristics of a time series data set;
program instructions to execute machine learning logic to allocate the time series data to one or more candidate machine learning pipelines based on the data allocation size, wherein a sequential order of the time series data set is used while allocating the time series data based on the data allocation size;
program instructions to execute the machine learning logic to train the one or more candidate machine learning pipelines using selected data associated with the time series data set;
program instructions to execute the machine learning logic to determine and cache one or more features for the time series data by the one or more candidate machine learning pipelines;
program instructions to evaluate predictions of each of the one or more candidate machine learning pipelines using at least the one or more features; and
program instructions to automatically generate a ranked list of machine learning pipelines from the one or more candidate machine learning pipelines for time series forecasting based upon evaluating predictions of each of the one or more candidate machine learning pipelines.

14. The computer program product of claim 13, further including program instructions to:
determine a holdout data set, a test data set, and a training data set from the time series data for allocating the time series data; and
evaluate the trained one or more candidate machine learning pipelines using the time series data, the hold data set, the test data set, and the training data set from the time series data.

15. The computer program product of claim 13, further including program instructions to allocate the time series data backward in time.

16. The computer program product of claim 13, further including program instructions to combine the one or more features with previously determined features for use by the one or more candidate machine learning pipelines.

17. The computer program product of claim 13, further including program instructions to cache the one or more features at a final estimator of the one or more candidate machine learning pipelines.

* * * * *